United States Patent [19]

Fujimori

[11] Patent Number: 5,177,602
[45] Date of Patent: Jan. 5, 1993

[54] IMAGE SCANNERS
[75] Inventor: Toshiro Fujimori, Tokyo, Japan
[73] Assignee: Konica Corporation, Tokyo, Japan
[21] Appl. No.: 847,889
[22] Filed: Mar. 10, 1992

Related U.S. Application Data

[63] Continuation of Ser. No. 635,369, Dec. 26, 1990, abandoned.

[30] Foreign Application Priority Data

Dec. 28, 1989 [JP] Japan .................... 1-341587

[51] Int. Cl.⁵ ............................................ G03F 3/08
[52] U.S. Cl. ...................................... 358/80
[58] Field of Search ................................ 358/75–81

[56] References Cited

U.S. PATENT DOCUMENTS

| | | |
|---|---|---|
| 4,677,465 | 6/1987 | Alkofer . |
| 4,841,362 | 6/1989 | Urabe et al. . |
| 4,866,513 | 9/1989 | Takahashi . |
| 4,984,071 | 1/1991 | Yonezawa . |

FOREIGN PATENT DOCUMENTS

| | | |
|---|---|---|
| 3447472A1 | 12/1984 | Fed. Rep. of Germany . |
| 87/02852 | 5/1987 | PCT Int'l Appl. . |
| 2067043 | 7/1981 | United Kingdom . |

OTHER PUBLICATIONS

Woods and Gonzalez, Proceedings of the IEEE, vol. 69, No. 5, May 1981, pp. 643–654.

Primary Examiner—Stephen Brinich
Attorney, Agent, or Firm—Finnegan, Henderson, Farabow, Garrett and Dunner

[57] ABSTRACT

This invention relates to an image scanning apparatus and more particularly to the scanning apparatus for use in a digital copier which obtains a negative image from an image of an original. A color image signal is generated from an image sensor by sensing a reflected light from an original through a scanner and an optical filter, and is converted to an image data consisting of a color code and a luminance data. Color histograms and summarized histogram are produced from the image data, which represent luminance distributions for each color code and a total luminance distribution. A pattern class for each histogram is identified by checking histogram shape, and coefficient data of mutual transfer function and gamma data are selected from data tables according to the identified pattern class. The luminance data are corrected in accordance with the selected coefficient data and gamma data.

5 Claims, 13 Drawing Sheets

IMAGE SCANNERS

This application is a continuation of application Ser. No. 07/635,369 filed Dec. 26, 1990, now abandoned.

BACKGROUND OF THE INVENTION

The present invention relates to an image scanner, and more particularly relates to an image scanner used for a digital copier by which inverse images can be obtained.

In a conventional digital copier, inverse images are obtained by reversing luminance data.

Figure 9:
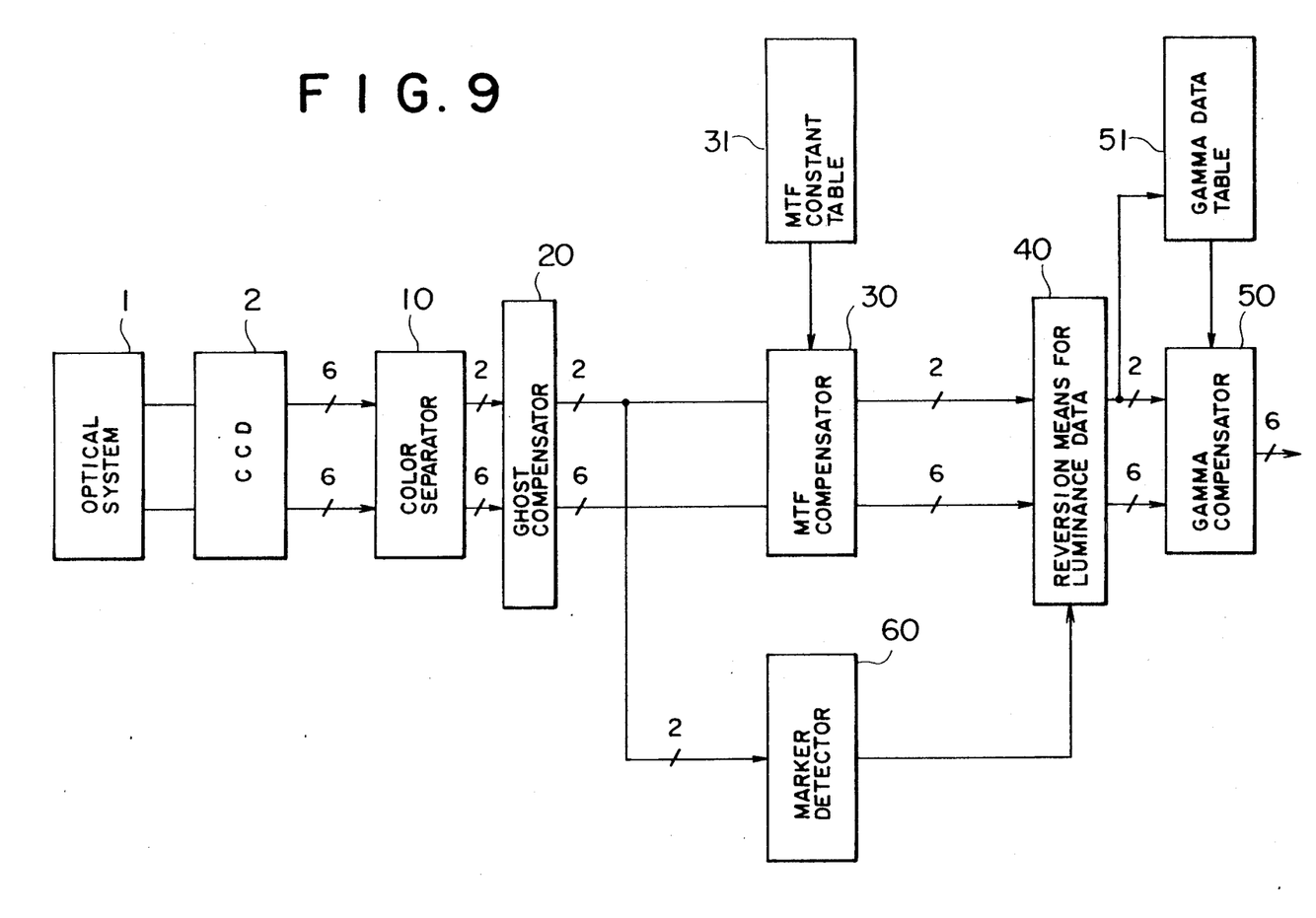
FIG. 9 is a block diagram showing the outline of the composition of an image scanner having the negative-positive inversion function which is applied to a conventional image scanner.

FIG. 9 is a block diagram showing an image scanner having a negative-positive inversion function which is used in a conventional digital copier.

In the image scanner illustrated in FIG. 9, image signals are processed as follows: a color-separated document image obtained by the optical system 1 is formed on the image sensors 2; color component signals sent from the image sensors 2 are color-separated by the color separator 10 into luminance data indicating the luminance level, wherein color codes showing red, blue, white and black are added to the luminance data; the color codes of luminance data are ghost-compensated by the ghost compensator 20; the above-described luminance data is compensated by MTF compensator 30 so that the luminance level can be compensated; and the luminance data is γ-compensated by the γ-compensator 50 in order to generate color density data. Further, this image scanner is provided with the marker detector 60 and the luminance data inverter 40, wherein the marker detector 60 detects a red or blue marker from the color codes to which luminance data is added and generates a pulse signal which shows the inverse portion in one scanning line, and wherein the luminance data inverter 40 inverts the luminance data corresponding to the above-described pulse signal.

However, in the above-described image scanner, when a document image is negative-positive inverted, the luminance data is uniformly inverted according to the pulse signal sent from the above-described marker detector 60, regardless of the background density level of the document image, so that a clear inverse image can not be obtained in the case of a document image having a high density background level such as a newspaper.

With reference to the conventional problems described above, the primary object of the present invention is to provide an image scanner which can obtain an inverse image of high gradation even when an image on a high density level background is scanned.

SUMMARY OF THE INVENTION

In order to accomplish the above-described object, the present invention is to provide an image scanner comprising: an image sensor which transforms a color-separated optical image into image data; a color separator which color-separates the above-described image data and generates luminance data to which color codes are added; a color compensator which color-compensates the above-described luminance data; a γ-compensator which γ-compensates the above-described luminance data; a marker signal generating means which generates a marker signal indicating a marker position on one scanning line, from a table supplying a MTF coefficient and γ-data, and from the above-described luminance data; a luminance data inverter which inverts the luminance data according to the above-described marker signal; a histogram generator which makes a histogram of each color and a summarized histogram; a histogram shape detector which detects the shape of the above-described histograms; and a table determinator which determines an MTF coefficient and γ-data according to the data obtained by the above-described histogram shape detector.

DETAILED DESCRIPTION OF THE PREFERRED EMBODIMENTS

Referring now to the attached drawings, an example embodying the present invention will be explained as follows.

Figures 1, 1A:
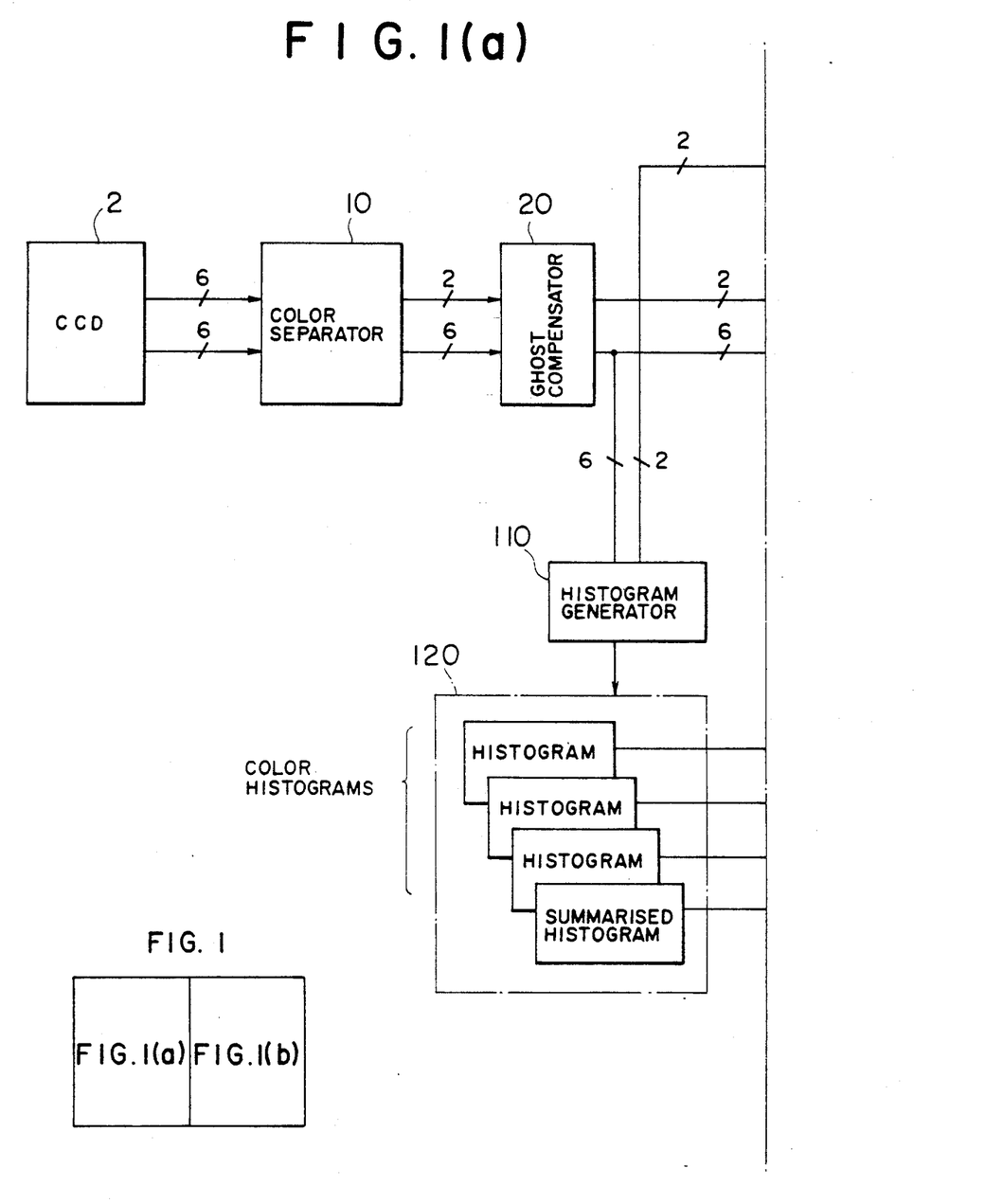
FIGS. 1a-1b are block diagrams of an image scanner embodying the present invention.
Figure 1B:
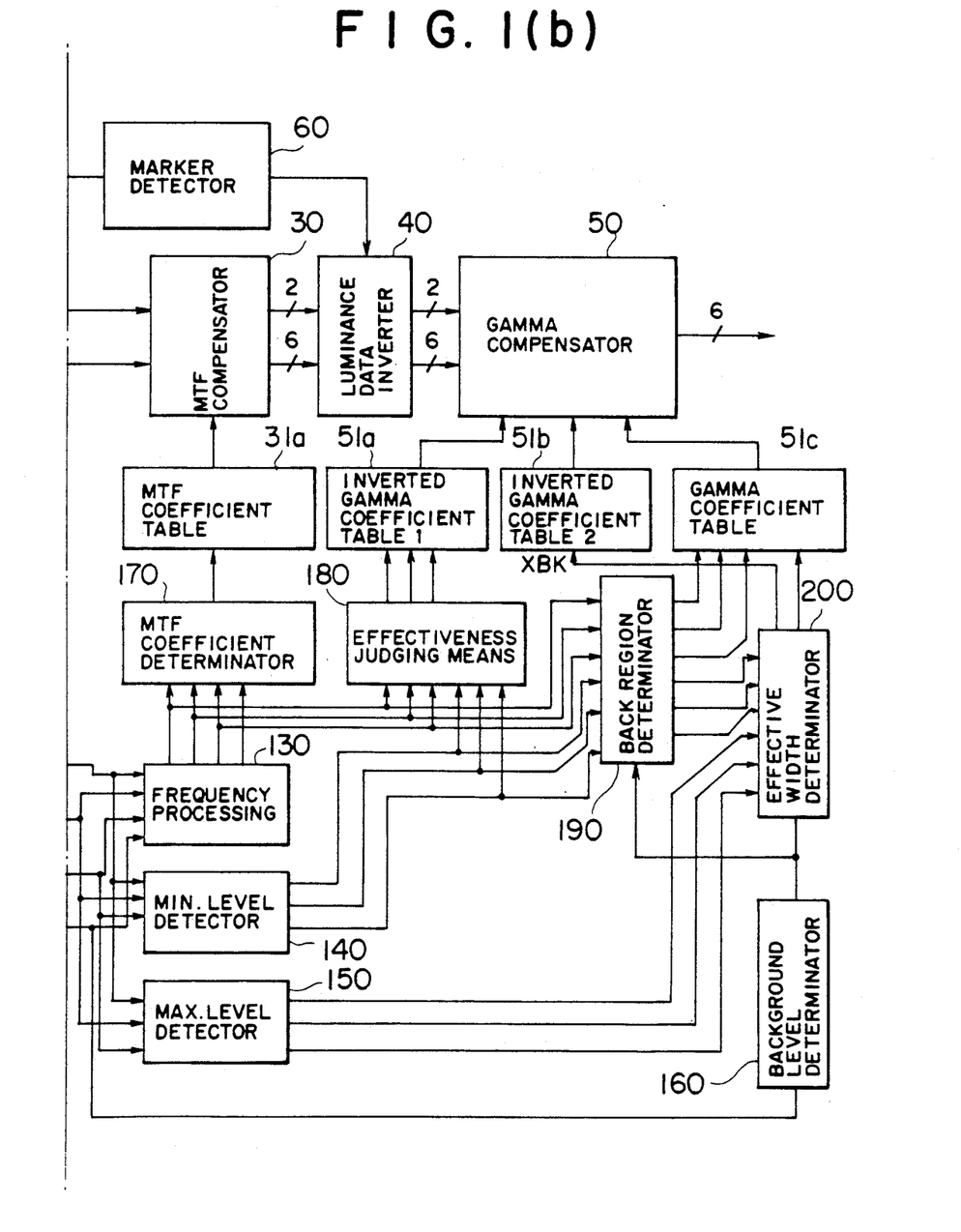

FIGS. 1(a) and 1(b) show a block diagram of an image scanner embodying the present invention.

The image scanner is provided with: the image sensor 2 (the CCD in the drawing); the color separator 10; the ghost compensator 20; the MTF compensator 30; the MTF coefficient table 31a; the γ-compensator 50; and the γ-tables 51a, 51b, 51c. In the image scanner described above, the density data is generated and outputted to an exposure unit (not illustrated in the drawing) in such a manner that: the optical image of a document is color-separated and formed on an image sensor; the luminance data is generated, to which the color codes are added according to the color signals outputted from the image sensor; and the luminance data is γ-compensated after MTF-compensation.

The image scanner of this example is provided with the following functions: the color and summarized histograms are generated from the luminance data obtained by prescanning the document; the EE system to recognize the shapes of the histograms is provided to the image scanner; and according to the EE system function, the kind of the document (the background level of the document) is judged and further it is judged whether the image is an inverse one or not, so that the MTF coefficient and γ-data can be selected.

The EE system of this example is provided with the following functions: the histogram generator 110 which generates the color and summarized histograms according to the luminance data to which the color codes are attached; the memory 120 to which the above-described color and summarized histograms are inputted; the histogram shape recognizing means which recognizes the shapes of the color and summarized histograms in the above-described memory 120; and the table determinator which determines the MTF coefficient and the γ-data according to the data sent from the above-described histogram shape recognizing means.

The histogram shape recognizing means is composed of: the frequency processing means 130 which counts the luminance data forming the above-described color and summarized histograms; the maximum level detector 140 which detects the level on the right (the maximum luminance) of the above-described color and summarized histograms; the minimum level detection 150 which detects the level on the left (the minimum luminance) of the above-described color and summarized histogram; and the background level determinator 160 which detects the background level according to the summarized histogram.

The table determinator is composed of: the MTF coefficient determinator 170 which selects the MTF coefficient by judging the kind of image according to the frequency of the luminance data composing the summarized histograms and histograms for each other; the effectiveness judging means 180 which judges the effectiveness of the histogram according to the frequency forming the summarized histogram, the left edge level of the summarized histogram, and the frequency composing the color histogram; the background region determinator 190 which determines the background region according to the background color level; and the effective width determinator 200 which determines the middle tone width according to the color background level and the left edge level of the color background histogram.

FIG. 2(a) to FIG. 2(h) are the summarized and color histograms which are generated from the luminance data obtained by prescanning. FIG. 2(a) to FIG. 2(d) are examples of a flat type histogram, and FIG. 2(e) to FIG. 2(h) are examples of a U-shaped histogram.

Figure 2A:
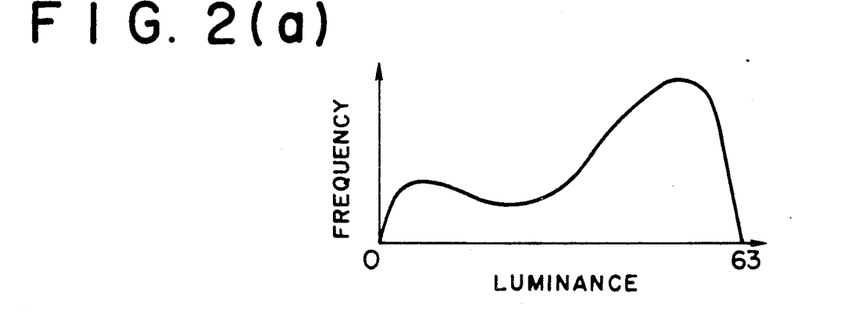
FIG. 2(a) to FIG. 2(h) are summarized histograms and histograms of each color which are generated from the luminance data obtained by prescanning.
Figure 2B:
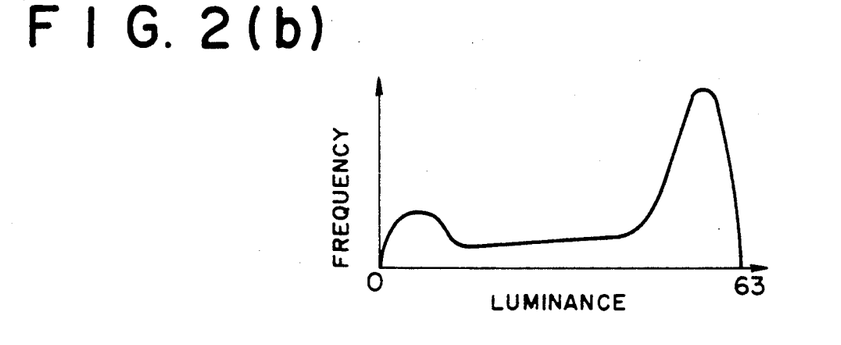
Figure 2C:
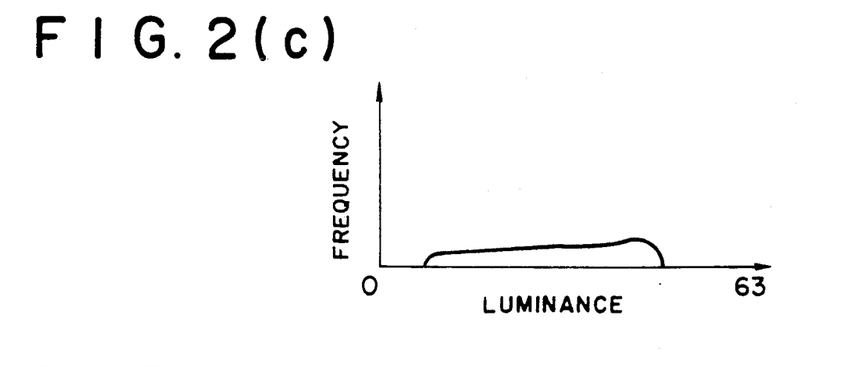
Figure 2D:
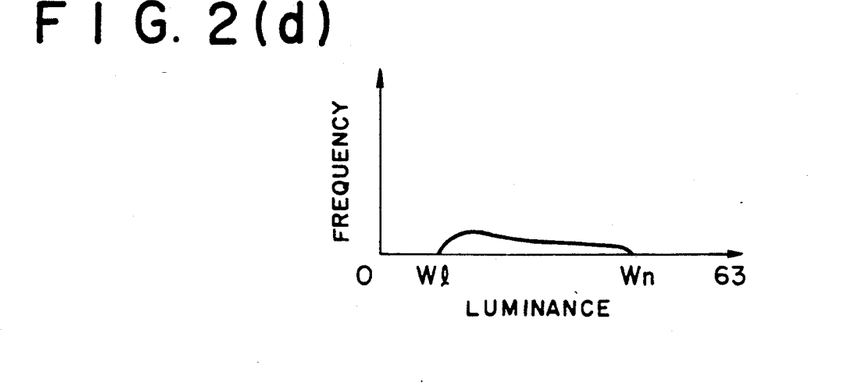
Figure 2E:
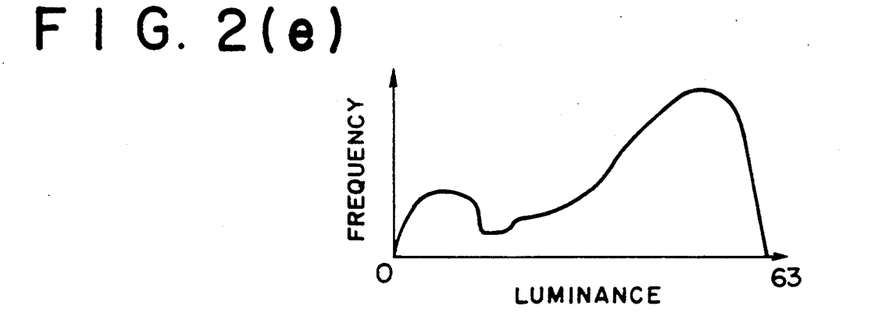
Figure 2F:
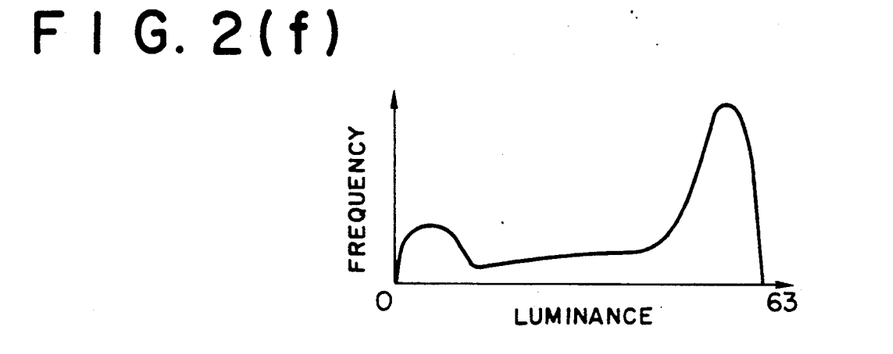
Figure 2G:
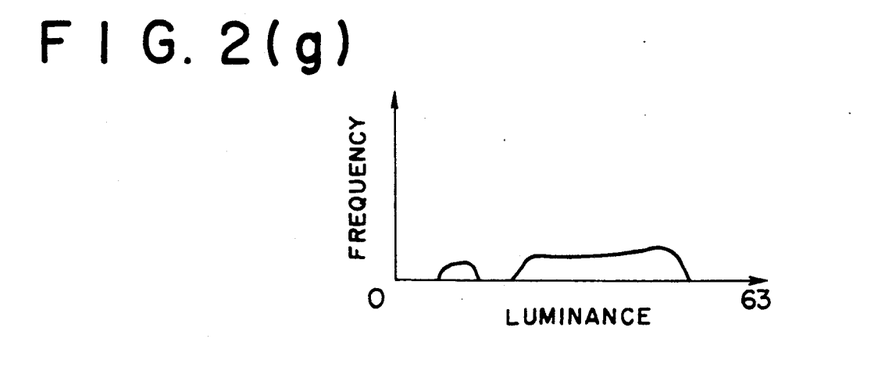
Figure 2H:
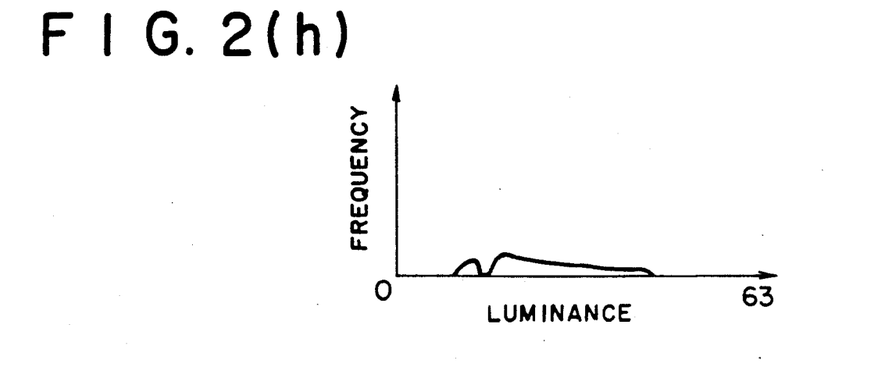

FIG. 2(a) and FIG. 2(e) are summarized histograms generated from the luminance data, the number of which is approximately 64800. FIG. 2(b) and FIG. 2(f) are histograms which are generated from the luminance data of a color code of black or white. FIG. 2(c) and FIG. 2(g) are histograms which are generated from the luminance data of a blue color code. FIG. 2(d) and FIG. 2(h) are histograms which are generated from the luminance data of a red color code. FIG. 2(g) and FIG. 2(h) are U-shaped histograms. In the histogram generator 110, in order to eliminate the influence of noise, the truncation frequency is set within 0.1% of the number of whole pixels. Accordingly, when the frequency does not reach the truncation frequency, the frequency is set to 0.

Figure 3A:
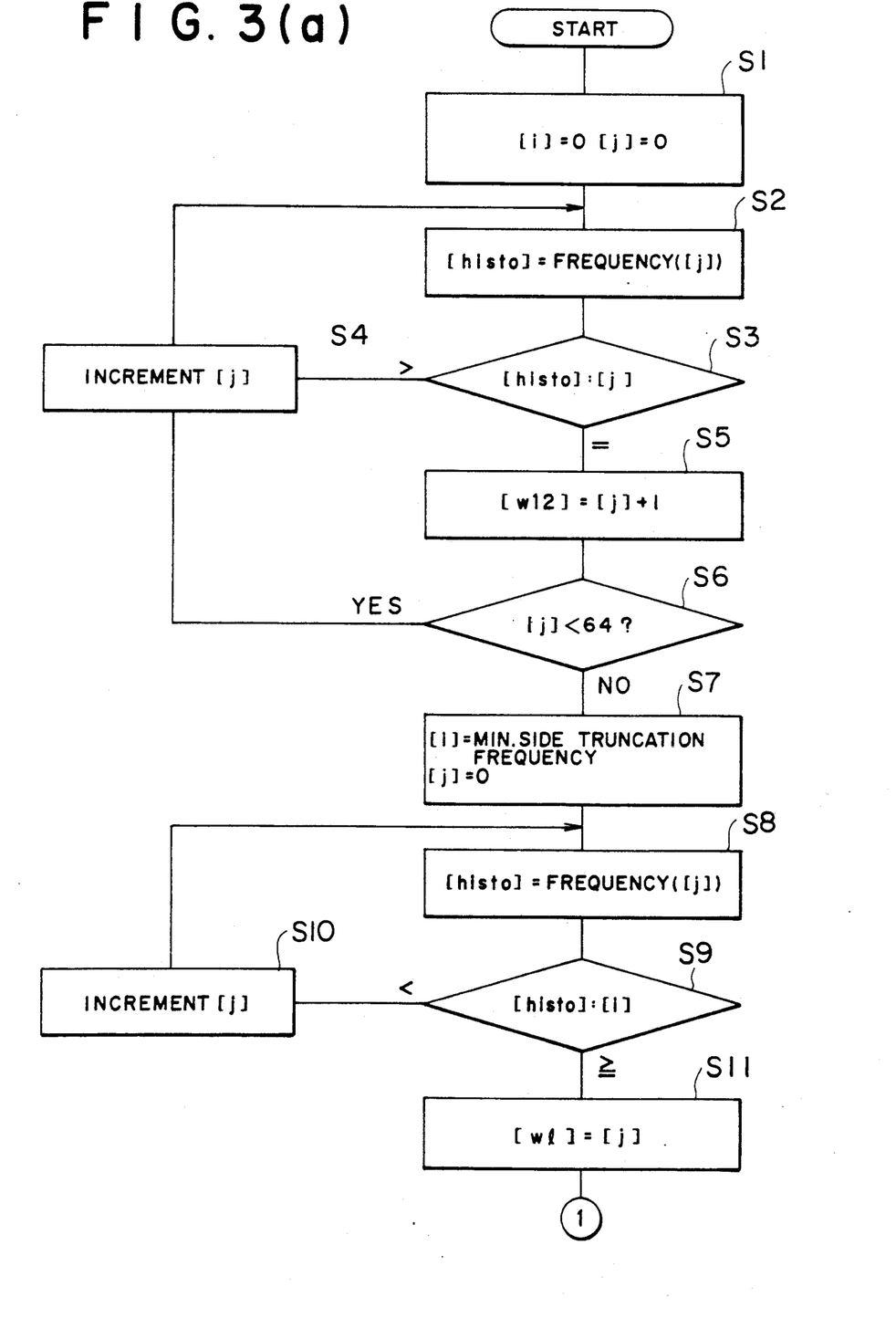
FIGS. 3(a), 3(b) are flow charts showing the algorithm by which the shape of a histogram can be detected in an EE system.
Figure 3B:
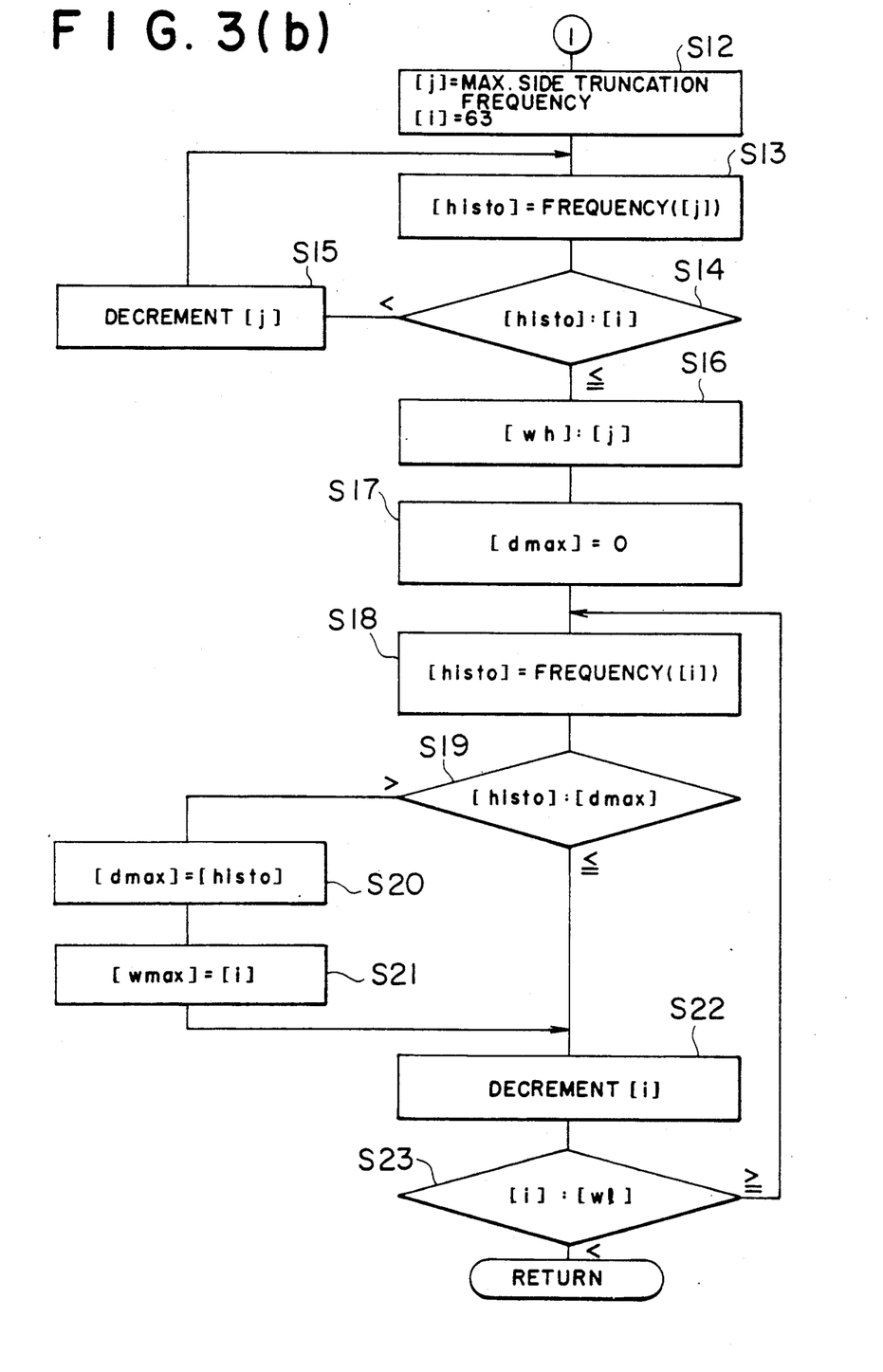

FIG. 3(a) and FIG. 3(b) are flow charts showing the algorithm which judges the shape of a histogram in the EE system.

The minimum level detector 150 checks to see whether the histogram is U-shaped or not. When the histogram is U-shaped, another algorithm is used which is shown in Step 1 to Step 6. The microprocessor corresponding to the minimum level detector 150 sets 0 on the register i, wherein 0 means a U-shaped histogram and sets 0 on the register j (S1). The microprocessor reads the grade of gradation corresponding to the value of the register j into histo (S2). The microprocessor compares the value of register histo with the value of register i (S3). When the value of register histo is more than the value of the register i, that is 0, the value of the register j is increased. (S4). On the other hand, when the value of the register histo is the same as the value of the register i, that is 0, the microprocessor sets the value consisting of the value of j added by 1, to w12 (S5). The microprocessor executes processing of step 1 to step 6 with regard to the level of 0 to 63. In this way, the U-shaped portion of a histogram can be detected, and the level w12 of the left edge can be detected.

Next, the microprocessor which is the left edge level detecting means 150, sets on the register i the truncation frequency of the low luminance side and sets 0 on the register j.(S7). The microprocessor reads in the level corresponding to the content of the register j, to the register histo (S8). The microprocessor compares the content of the register histo with that of the register i (S9). When the content of the register histo is more than the content of the register i, the content of the register j is increased (S10).

In the way described above, the microprocessor searches the left edge level of a histogram by processing of step 8 and step 9. When the content of the register histo is smaller than that of the register i in step 9, the microprocessor writes the content of the register j on the register wl. In the manner described above, the microprocessor detects the left edge level of a histogram.

The microprocessor which is the right edge level detecting means 140, sets on the register i the truncation frequency of the high luminance side, and sets 63 on the register j (S12). The microprocessor reads in the frequency of the level corresponding to the content of the register j, to the register histo (S13). The microprocessor compares the content of the register histo with that of the register i (S14). When the content of the register histo is smaller than the content of the register i, the content of the register j is decreased (S15). In the manner described above, the microprocessor seeks the right edge level by processing of step 13 and step 14. When the content of the register histo is more than the register i in the step 14, the microprocessor inputs the content of the register j on the register wh (S16). In this way, the microprocessor detects the right edge level of a histogram. Here, the right edge level of a histogram becomes the brightest.

The microprocessor sets 0 on the register dmax and writes the value of the register wh on the register i (S17). The microprocessor reads in the distribution frequency of the luminance corresponding to the value of the register i, into the register histo (S18). The microprocessor compares the value of the register histo with the that of the register dmax (S19). When the value of the register histo is larger than the value of the register dmax, the microprocessor writes the value of the register histo on the register dmax (S20), and writes the value of the register i on the register wmax (S21). When the value of the register histo is smaller than the value of the register dmax, or when the value of the register i is smaller than the value of the register wl in the step 19, the microprocessor decreases the value of the register i (S22). The microprocessor compares the value of the register i with the value of the register wl which is the left edge level (S23). In other words, when the value of the register i is smaller than the value of the register wl, the processing of the steps 17-23 is completed. Passing through the steps 17-23, the microprocessor can detect the level of the maximum frequency in each color histogram.

Figure 4A:
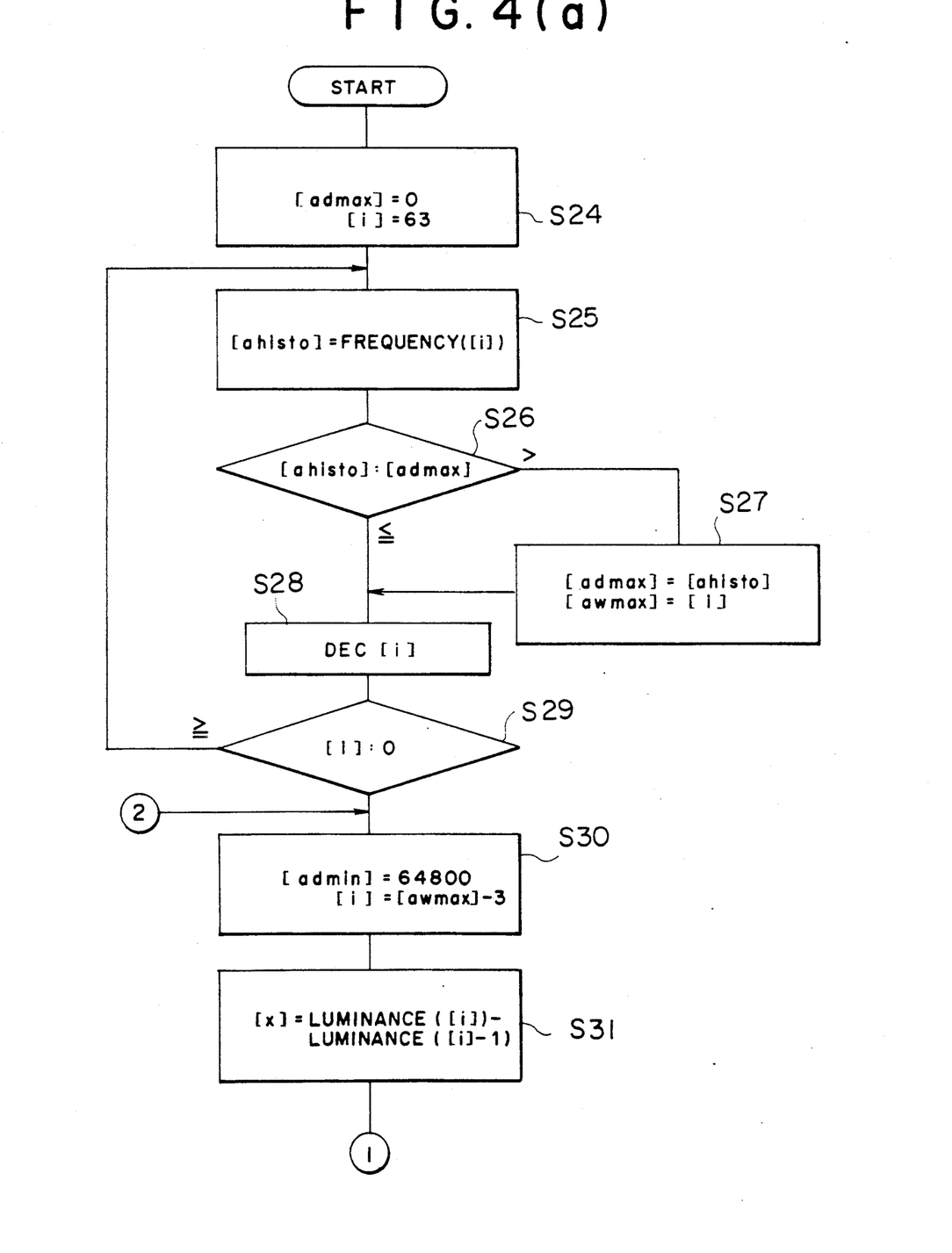
FIGS. 4(a) and 4(b) are flow charts showing the process to detect the maximum frequency and the level in the summarized histogram and to detect the summarized background level.
Figure 4B:
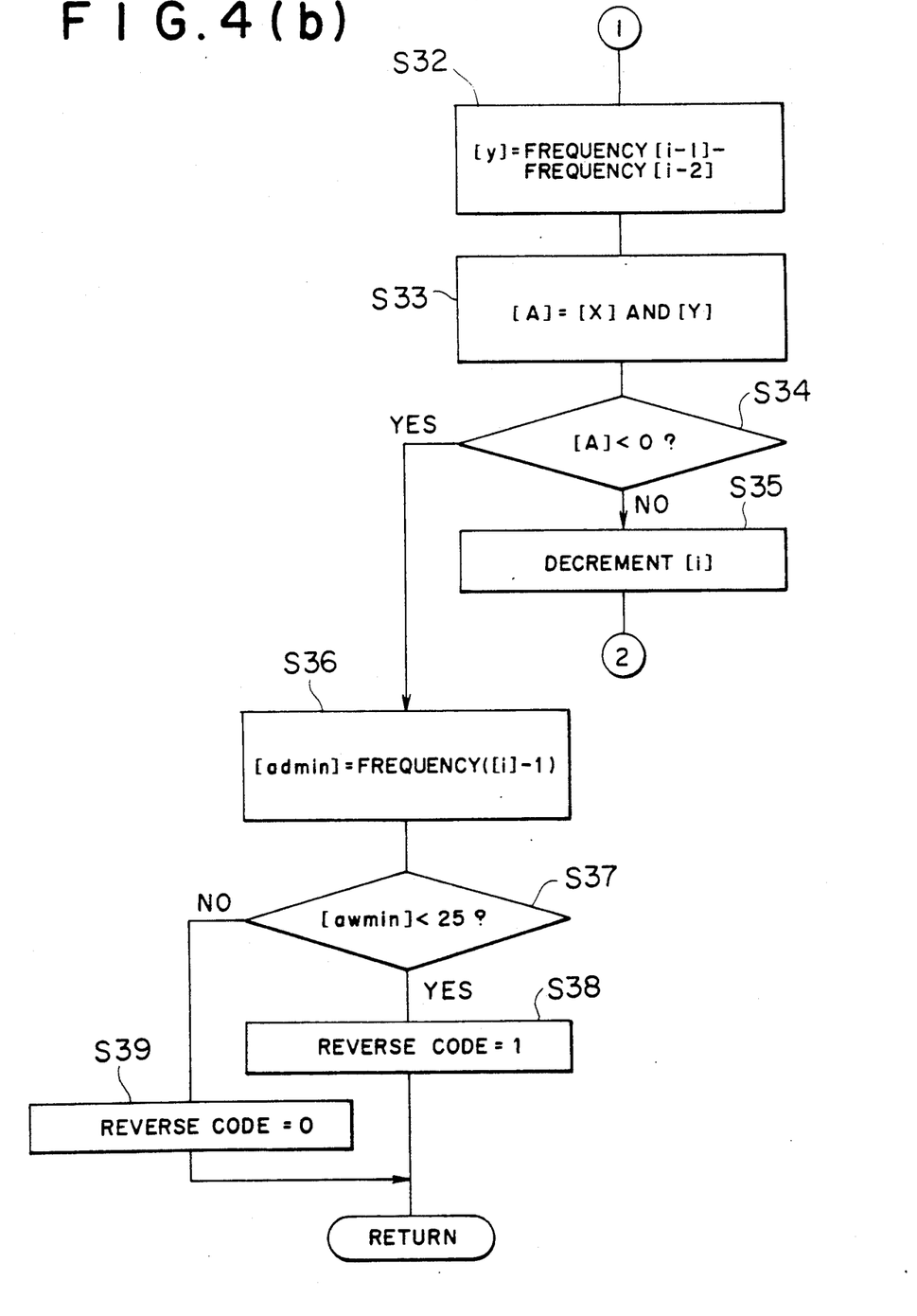

FIG. 4 is a flow chart to detect the maximum frequency in the summarized histogram, the level of the maximum frequency and the level of the summarized background.

The microprocessor which is the detecting means 160 of the summarized background, sets 0 on the register admax, and sets 63 on the register i (S24). The microprocessor reads the frequency of the level corresponding to the value of the register i, into the resister ahisto (S25). The microprocessor compares the value of the register ahisto with the value of the resister dmax (S26). When the value of the register ahisto is smaller than the value of the register admax, the microprocessor decreases the value of the register i (S28). When the value of the register i is not less than 0, the microprocessor returns to the step 25. On the other hand, when the value of the register ahisto is smaller than the value of the register admax in the step 26, the microprocessor replaces the value of the register admax with the value of the register ahisto, and replaces the value of the register awmax with the value of register i (S27). The microprocessor decreases the value of the register i (S28) and executes processing of step 29. The microprocessor can detect the maximum frequency and its level of the summarized histogram by processing the steps 24-29.

The microprocessor sets 64800, which is the number of pixels obtained by prescanning, on the register adim, and sets on the register i the value which is obtained by subtracting 3 from the value (the level of the maximum frequency) of the register awmax (S30).

The microprocessor computes the frequency of the level corresponding to the value of register i, computes the frequency of the level corresponding to the value which can be obtained by subtracting 1 from the value of register i, and computes the frequency of the level corresponding to the value which can be obtained by subtracting 2 from the value of register i. The difference is determined among these frequencies. Then, AND of the difference values is found, and the difference value is stored in register A (S30 to S33). The microprocessor judges whether the value of register A is minus or not (S34). When the value of register A is plus, the microprocessor executes a decrement of the value of register i (S35) and conducts processing of step 30. The microprocessor repeats the processing of steps 30 to 35. When the value of register A is minus at the step 34, the frequency of the gradation corresponding to the value obtained by subtracting 1 from the value of register i, is written in register admin, and the value obtained by subtracting 1 from the value of register i is written in register awmin (S36). In the way described above, the microprocessor can detect the background level and its frequency.

The microprocessor compares the value of register awmin with 25 (S37), and when the value of register awmin is smaller than 25, the inverse code is set to 1 (S38). When the value of register awmin is larger than 25, the microprocessor sets the inverse code to 0 (S39).

Figure 5:
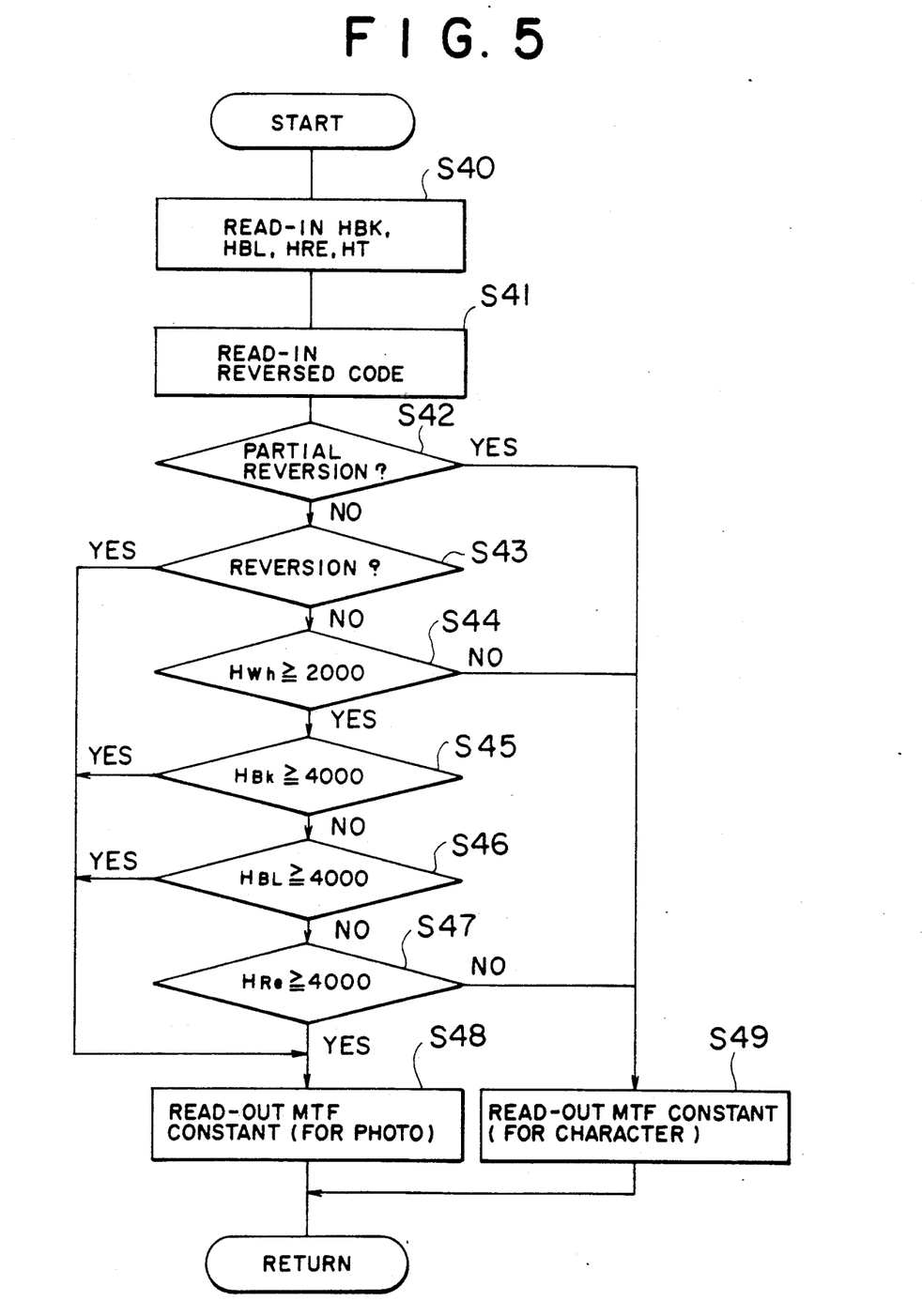
FIG. 5 is a flow chart showing the algorithm of the MTF coefficient determining means.

FIG. 5 is a flow chart which shows the algorithm of the MTF coefficient determining means.

The microprocessor corresponding to the MTF coefficient determining means 170 reads in the frequency of each color and the summarized frequency (S40). The microprocessor reads in the inverse code (S41). The microprocessor reads in negative and positive signals which represent whether the negative-positive inversion has been conducted or not. When the negative-positive inversion has been conducted, the microprocessor reads out character-type MTF coefficients from the MTF coefficient table 31*a* (S49). The microprocessor judges from the inverse code whether it is an inverse image or not. When the image is judged to be an inverse image, the microprocessor reads out photograph-type MTF coefficients from the MTF coefficient table 31*a* (S48). When the luminance data of red is not more than 40,000 or the luminance data of white is not more than 20,000, the microprocessor reads out character-type MTF coefficients from the MTF coefficient table 31*a* (S49).

Figure 6:
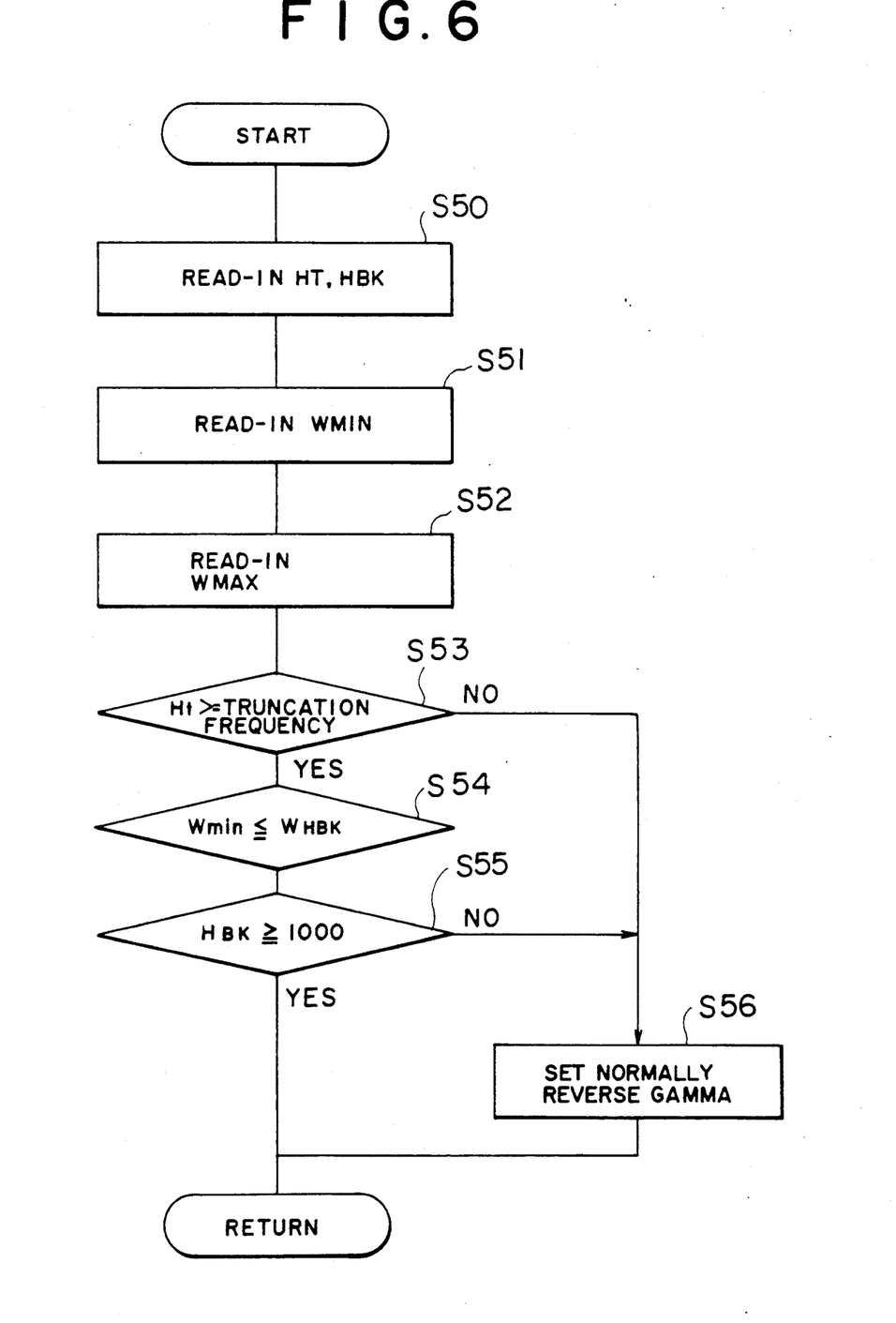
FIG. 6 is a flow chart showing the algorithm of the histogram effectiveness judging means.

FIG. 6 is a flow chart which shows the algorithm of the histogram effectiveness judging means.

The microprocessor corresponding to the histogram effectiveness judging means 180 reads the summarized frequency Ht of the luminance data and reads the total frequency Hbk into the luminance data of black (S50). The microprocessor reads in the summarized background level Wmin of the summarized histogram (S51). The microprocessor reads in the brightest level (S52). The microprocessor compares the summarized frequency Ht with the truncation frequency (S53), and compares the summarized background level Wmin with the brightest level Whbk of the black luminance data (S54). In the way described above, the microprocessor checks whether the summarized frequency Hbk of the black luminance data is more than 1,000 or not (S55). When the summarized frequency Hbk is smaller than the truncation frequency or the summarized frequency Hbk of the black luminance data is not more than 1,000, the microprocessor reads out normal inverse coefficient γ from the γ coefficient table 51*a* (S56)). When the summarized frequency Hbk is larger than the truncation frequency or the summarized frequency Hbk of the black luminance data is larger than 1,000, the microprocessor reads out coefficient γ from the γ table in which the background level is taken into account, as illustrated in FIG. 7 and FIG. 8.

Figure 7:
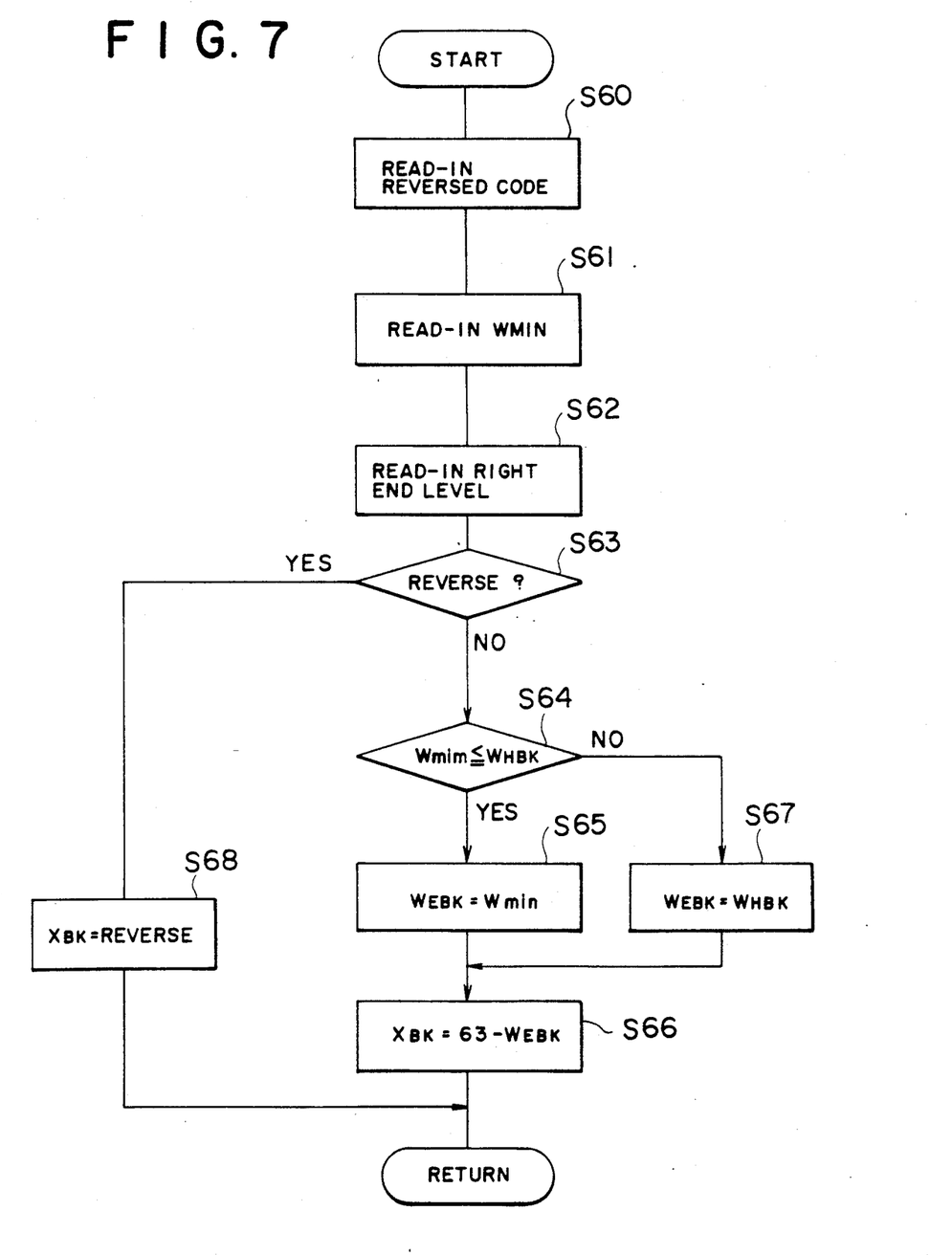
FIG. 7 is a flow chart showing the algorithm of the background region determinator which determines the background level and the background region according to the color histogram.

FIG. 7 is a flow chart which shows the algorithm of a color background range determining means which determines the background level and background range according to color histograms.

The microprocessor which is a color background range determining means 190, reads in the inverse code (S60), the background level Wmin of the summarized histogram (S61), and the brightest level Whbk (S62). Then the microprocessor conducts negative-positive inversion (S63) and determines the background range (S68). The microprocessor compares the summarized background level Wmin with the brightest level Whbk of the black luminance data (S64). When the summarized background level Wmin is smaller than the brightest level Whbk, the background level Webk in the black luminance data is set to the brightest level Whbk (S67). When the summarized background level Wmin is not less than the black luminance data Whbk, the color background level Webk in the black luminance data is used as the summarized background level Wmin (S65). The microprocessor determines the background range Xbk by subtracting the color background level Webk from 63 which shows the maximum gradation (S66). As explained above, the microprocessor can determine the color background level We so that the background range can be determined from the color background level We.

Figure 8:
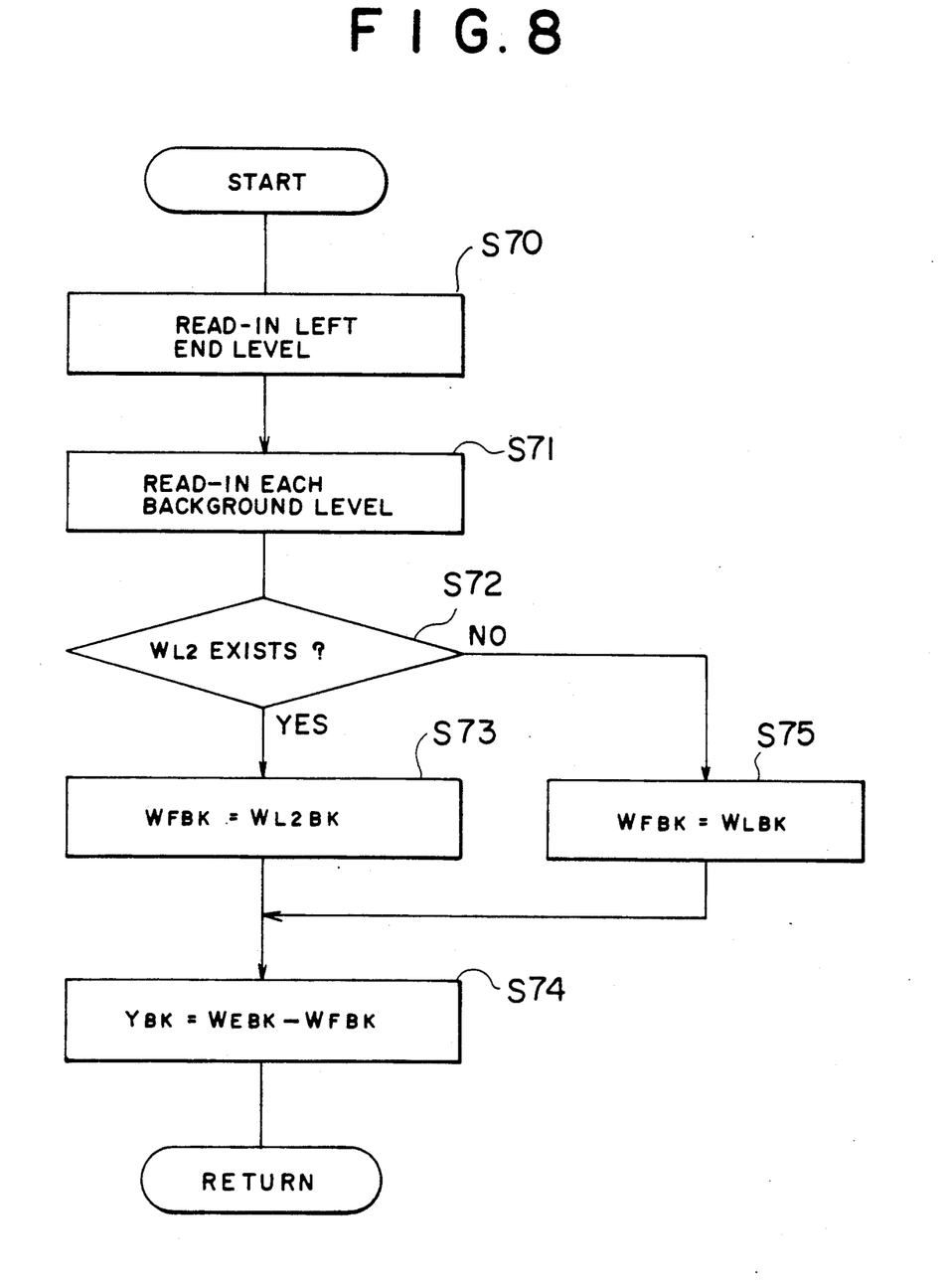
FIG. 8 is a flow chart showing the algorithm of the effective width determinator which detects the width of the middle tone in the histogram.

FIG. 8 is a flow chart showing the algorithm of the effective width determining means which detects the halftone width of a histogram. The microprocessor corresponding to the effective width determining means 200 reads in the darkest color level Wf (S70) and the color background level We (s71). The microprocessor detects whether the color histogram has the darkest level W12 which exists when a U-shaped portion in a histogram occurs (S72). The darkest level W12 is used as the dark side edge level WF (S73). On the other hand, when there is no U-shaped portion in a histogram, the darkest level W1 is used as the dark side edge level WF (S75). The effective width is outputted from the microprocessor, wherein the effective width is determined by subtracting the dark side edge level WF from the background level We (S74).

As explained above, an image of high gradation can be obtained by the image scanner of this example, in that: a summarized color histogram is made from the summarized luminance data obtained by prescanning; the shape of the histogram is perceived; a MTF coefficient is determined according to the shape of the histogram and the kind of an image (an inverse image or not); and the width of a halftone range is determined at each color according to the shape of a color histogram.

In the image scanner of this example, a negative-positive inverse image of high gradation can be obtained from inverse data in such a manner that: a marker detecting means and a luminance data inverse means are utilized; and a MTF coefficient and a γ table are selected.

As explained above, the present invention is to provide an image scanner comprising: an image sensor which transforms a color-separated optical image into image data; a color separator which color-separates the above-described image data and generates luminance data to which color codes are added; a color compensator which color-compensates the above-described luminance data; a γ-compensator which γ-compensates the above-described luminance data; a marker signal generating means which generates a marker signal indicating a marker position on one scanning line, from a table supplying a MTF coefficient and γ-data, and from the above-described luminance data; a luminance data inverter which inverts the luminance data according to the above-described marker signal; a histogram generator which makes a histogram of each color and a summarized histogram; a histogram shape detector which detects the shape of the above-described histograms; and a table determinator which determines a MTF coefficient and γ-data according to the data obtained by the above-described histogram shape detector. Accordingly, in the apparatus of the present invention, an MTF coefficient and γ data can be determined according an image by judging whether the image is an inverse image or not and by determining the width of a halftone range in accordance with the background level of the image.

What is claimed is:

1. An image scanning apparatus comprising:
   means for generating a color image signal in response to a reflected light from an original;
   means for converting the color image signal into image data having a color code data and a luminance data;
   means for generating a marker signal based on the image data to indicate a marker position in a line of scanning;
   means for converting the luminance data into negative image luminance data in a location indicated by the marker position;
   means for producing color histograms and a summarized histogram from the image data, wherein each of the color histograms represents a luminance distribution of the image data having the same color code and the summarized histogram represents a total luminance distribution of the color histograms;
   means for recognizing the shape of each of the color and summarized histograms and identifying a pattern class of each of the color and summarized histograms as a function of the recognized shape;
   gamma-selecting means for selecting a predetermined gamma data from a plurality of stored gamma data as a function of the identified pattern class; and
   gamma-correcting means for correcting the luminance data based upon the selected gamma data.

2. The image scanning apparatus of claim 1, wherein the color image signal generating means comprises means for color-separating the reflected light whereby the color image signal is generated in accordance with the color-separated light.

3. The image scanning apparatus of claim 1, further comprising means for correcting the color code data.

4. The image scanning apparatus of claim 1, further comprising:
   coefficient-selecting means for selecting a set of coefficient data for a modulation transfer function corresponding to the identified pattern class; and
   gradation-correcting means for correcting the luminance data by application of the selected coefficient data.

5. An image scanning apparatus comprising:
   means for generating a color image signal in response to a reflected light from an original;
   means for converting the color image signal into image data having a color code data and a luminance data;
   means for generating a marker signal based on the image data to indicate a marker position in a line of a scanning;
   means for converting the luminance data into negative image luminance data in a location indicated by the marker position;
   means for producing color histograms and a summarized histogram based upon the color code data and the luminance data of the image data, wherein each of the color histograms represents a luminance distribution of luminance data with each color code and the summarized histogram represents a total luminance distribution;
   means for recognizing the shape of each of the color and summarized histograms and identifying a pattern class of each of the color and summarized histograms as a function of the recognized shape;
   coefficient-selecting means for selecting a set of coefficient data for a modulation transfer function from a plurality of sets of stored coefficient data corresponding to the selected pattern class; and
   gradation correction means for correcting the luminance data the selected coefficient data.

* * * * *

UNITED STATES PATENT AND TRADEMARK OFFICE
CERTIFICATE OF CORRECTION

PATENT NO. : 5,177,602
DATED : January 05, 1993
INVENTOR(S) : Toshiro FUJIMORI It is certified that error appears in the above-identified patent and that said Letters Patent is hereby corrected as shown below:

On title page, item [54] and col. 1, line 1, change "IMAGE SCANNERS"

to --IMAGE SCANNER INCLUDING LUMINANCE CORRECTION AND INVERSION--

Item [57] ABSTRACT, line 7, delete "an"
Item [57] ABSTRACT, line 8, delete "a"
Col. 8, claim 5, line 67, after "data" (first occurrence) insert
--based upon--

Signed and Sealed this

Eighteenth Day of January, 1994

Attest:

BRUCE LEHMAN

*Attesting Officer*     *Commissioner of Patents and Trademarks*